United States Patent [19]

Anolick et al.

[11] 4,174,420

[45] Nov. 13, 1979

[54] UPHOLSTERED FURNITURE HAVING IMPROVED FLAME RESISTANCE

[75] Inventors: Colin Anolick; Vivian M. Robinson, both of Wilmington; Charles W. Stewart, Sr., Newark, all of Del.

[73] Assignee: E. I. Du Pont de Nemours and Company, Wilmington, Del.

[21] Appl. No.: 572,709

[22] Filed: Apr. 29, 1975

[51] Int. Cl.$^2$ .............................................. B32B 3/26
[52] U.S. Cl. ..................................... 428/310; 156/78; 428/921; 297/452; 521/85; 521/90; 521/92; 521/136; 5/459
[58] Field of Search ...................... 260/2.5 AJ, 2.5 FP; 428/159, 160, 310, 315, 334, 521, 921, 320; 106/15 FP; 156/78; 297/455, 457, 452, DIG. 5; 5/345 R

[56] References Cited

U.S. PATENT DOCUMENTS

| | | | |
|---|---|---|---|
| 2,567,951 | 9/1951 | Lewis | 428/56 |
| 2,567,953 | 9/1951 | Lewis | 156/78 |
| 2,792,320 | 5/1957 | Bower | 428/159 X |
| 2,880,183 | 3/1959 | Weissert | 260/2.5 |
| 3,512,192 | 5/1970 | Simon | 5/345 |
| 3,639,298 | 2/1972 | Lister et al. | 260/2.5 FP |
| 3,670,348 | 6/1972 | Irwin | 5/345 |
| 3,740,357 | 6/1973 | Wax | 260/2.5 L |
| 3,772,220 | 11/1973 | Parker et al. | 260/2.5 L |
| 3,813,715 | 6/1974 | Sookne | 5/345 |
| 3,816,307 | 6/1974 | Woods | 252/8.1 |
| 3,825,464 | 7/1974 | Crowley | 428/96 |
| 3,854,983 | 12/1974 | Brodnyan | 428/328 |
| 3,857,126 | 12/1974 | Woodruff | 5/345 |
| 3,865,760 | 2/1975 | Pitts et al. | 260/2.5 AJ |
| 3,934,285 | 1/1976 | May | 5/345 R |

OTHER PUBLICATIONS

B. F. Goodrich Co., "Latex Foam Applications", pp. 1-15.
Carl, J. C., "Neoprene Latex", Product Bulletin, E. I. DuPont Co., 1962, p. 93.
Murray, R. M. et al., "The Neoprenes", Product Bulletin, E. I. DuPont Co., 1963, p. 62.
Stewart et al., "The Effect of Compounding Variables on the Rate of Heat and Smoke Release from Poly Chloroprene Foam", Rubber Chemistry and Technology, vol. 48, No. 1, Mar.-Apr., 1975, (reprint), presented Oct. 15-18, 1974.

*Primary Examiner*—P. E. Willis, Jr.

[57] ABSTRACT

Flame resistance of upholstered furniture is significantly improved by interposing between the cover fabric and the padding or applying to the top side of the cover fabric a layer of neoprene foam capable of forming when exposed to a burning cigarette or under the conditions of a standard flame spread test, a thermally insulating char which does not smolder, and which maintains its structural integrity. The neoprene foam must be so formulated that it also is capable of evolving at combustion temperature sufficient amount of water to efficiently cool the affected area. Normally, the latex from which the foam is prepared is formulated with a char promoter and a hydrated inorganic compound. Upholstered furniture of this invention passes a burning cigarette test and performs extremely well in the flame spread test.

37 Claims, No Drawings

UPHOLSTERED FURNITURE HAVING IMPROVED FLAME RESISTANCE

BACKGROUND OF THE INVENTION

This invention relates to a novel process for improving the flame resistance of upholstered furniture, and especially of upholstery fabrics, and to upholstered furniture, upholstery fabrics, furniture padding, mattresses, and box springs, having improved flame resistance.

Upholstered furniture, while providing comfort to the user and esthetic appeal to the viewer, often is a major fire hazard in the home or in a public place. A careless cigarette smoker, for example, may set an upholstered chair or sofa aflame by allowing a burning cigarette to rest on the cover fabric. Furthermore, in case of fire on the premises, upholstered furniture burns easily and contributes to the spreading of the fire. It is expected that the U.S. government through its Consumer Safety Protection Agency will shortly promulgate certain minimum safety requirements, which upholstered furniture will have to satisfy in order to qualify for sales in interstate commerce.

Upholstered furniture usually contains the following structural components: (1) a frame, which may be open or closed; if open, it also contains a webbing; (2) springs; (3) padding or stuffing; and (4) covering. The frame is most often made of wood but may also be made of metal or plastic or any combination of those materials. The springs usually are made of metal but may be made of rubber straps. In certain types of furniture the springs are omitted.

For the purpose of the present invention, the term "upholstered furniture" also includes beds and bed components, such as mattresses and box springs. A mattress usually consists of a cover fabric, a padding, and springs or a cover fabric and an elastomeric padding without springs. A box spring contains a frame and springs and usually is covered with a fabric, which normally is protected from contact with the springs by a padding. The padding is the main cause of high furniture flammability because of the nature of the materials used therein. Most upholstered furniture manufactured today uses polyurethane foam cushions for the seats and often also for the backs. Polyurethane foam also is often used as padding in mattresses. However, such foam is highly flammable. Other types of padding include pillows filled with polyester fabric, cellulosic fiber, and rubberized hair. Those materials are flammable not only because of their chemical compositions but also because of their loose, fibrous structure. The covering fabric may be made of just about any fiber or fiber blend, including polypropylene, nylon, polyester, rayon, cotton, and wool. The fabric may be coated with a plastic or elastomeric coating such as, for example, polyvinyl chloride or polyurethane. Some of those fabrics are less flammable than others, but even those that are not readily ignited on contact with a source of fire (such as, for example, a burning cigarette) melt at the high temperature of that source and thus expose the more flammable padding material underneath.

It is apparent from the above brief discussion that the fire hazard could be reduced most effectively if the total construction were made less hazardous. Making either fabric or padding more flame resistant does not necessarily improve the safety of the complete upholstered structure, for example, a piece of furniture.

SUMMARY OF THE INVENTION

According to the present invention, it has now been discovered that the flame resistance of upholstered furniture is considerably improved by interposing between the cover fabric and the padding or applying to the top side of the cover fabric a layer of a chloroprene polymer (neoprene) foam capable of envolving at combustion temperature sufficient amount of water to efficiently cool the affected area and capable of forming, when exposed to a burning cigarette or subjected to the Radiant Panel Test, a thermally insulating char which does not smolder and which maintains its structural integrity. Under standard test conditions, such as the California test of flame retardance of upholstered furniture, an upholstery fabric maintained in intimate contact with the neoprene foam should not ignite when a burning cigarette is placed on the fabric, and the extent of fabric degradation should not exceed 2 inches (5.1 cm.) in any direction from the fire source. The Radiant Panel Test is a standard flame spread index. It will be described below.

DETAILED DESCRIPTION OF THE INVENTION

The commercially most attractive embodiment of the present invention would be applying to the underside of an upholstery fabric the required thickness of a suitable neoprene foam. As an alternative, the neoprene foam can be applied to the outside of the padding. This could be, for example, a polyurethane cushion to which would be attached integrally an outer layer of neoprene foam. It also is possible to achieve good flame resistance by simply placing an neoprene foam interliner between the covering and the padding.

Upholstery fabric often is coated at least on one side with a continuous layer of a plastic or elastomeric material, which gives it a leathery appearance. The individual fibers cannot be seen through the coating. In such a case, the neoprene foam of the present invention may be applied to the top side of the fabric, rather than to the underside, between the fabric and the plastic or elastomeric coating.

In all these applications, the thickness of the neoprene foam layer can be as little as 1/16 inch (about 1.6 mm.) and usually does not exceed 1 inch (2.54 cm.). The preferred thickness is about ⅛-¼ inch (about 3.18-6.3 mm.). It has been found that when the neoprene foam is applied directly to the underside of an upholstery fabric, to give a layer within the preferred thickness range, all the fabrics tested irrespective of the type of fiber and type of weave (e.g., "loose" vs. "tight") passed the burning cigarette test. In fact, most of the fabrics tested qualified for the top rating, that is, exhibited a degradation area smaller than 1.5 inches (3.8 cm.) from the fire source in any direction. The precise testing technique will be described in the Experimental Part, below. In addition to woven upholstery fabrics, nonwoven fabrics made of a variety of fibers, natural or synthetic, can be used.

The neoprene foam must be specially formulated to form on exposure to a burning cigarette or under the conditions of the Radiant Panel Test a nonsmoldering char having structural integrity. Usually, the following two ingredients will be present in the formulation: a char promoter and an inorganic, hydrated compound which retains most or all of its hydration water at the foam drying and curing temperature, but loses is below about 500° C.

The char promoter may be any chemical compound or composition which is not volatile at the ignition temperature, is itself nonflammable or has low flammability, and forms at the ignition temperature a char-protecting structure, for example, by crosslinking, fusing or fluxing, increasing its bulk or by some other chemical reaction or physical change. Suitable char promoters include, for example, urea/formaldehyde resins, melamine formaldehyde resins, melamine phosphate, phthalic anhydride, pyromellitic anhydride, sodium borate, calcium borate, zinc borate, and boric acid. Phosphorus and boron compounds are known to promote char formation. All such compounds are commercially available under a variety of trade names. The char promoter can be added to the neoprene latex in dry form prior to frothing. If a resin, such as a melamine/formaldehyde resin, is used as the char promoter, it preferably should be added to the neoprene latex before the neoprene itself is isolated therefrom. Dipping a formed neoprene foam in a resin solution or dispersion does not usually produce the desired effects. The inorganic, hydrated compound also is preferably added to the latex. The effective proportion of the char promoter will be about 5–15 parts per 100 parts by weight of neoprene (phr). The inorganic, hydrated compound can be, for example, hydrated alumina, hydrated magnesia, magnesium oxychloride, hydrated zinc borate, and hydrated calcium borate. The amount of the inorganic compound can vary. In the case of hydrated alumina, the effective proportion is about 10–180 parts per 100 phr, or even higher. When the amount of hydrated alumina decreases below the lower limit of this range, little protection, if any, is provided by this ingredient. Above the upper limit, good fire protection is obtained, but the structural integrity of the foam sometimes is adversely affected at such high loading levels. However, there is no theoretical reason to limit the upper range of the hydrated alumina proportion. The proportion of other inorganic compounds should be based on equivalent amounts of available hydration water. It is to be noted that, while nonhydrated zinc borate and calcium borate can function as char promoters, hydrated zinc borate and hydrated calcium borate can function as both char promoters and hydration water sources.

The neoprene itself can be a homopolymer of chloroprene or a copolymer of chloroprene with another organic monomer. Usual monomers are vinyl compounds or olefinic compounds, such as, for example, styrene, a vinyltoluene, a vinylnaphthalene, 1,3-butadiene, isoprene, 2,3-dimethyl-1,3-butadiene, 2,3-dichloro-1,3-butadiene, methyl vinyl ether, vinyl acetate, methyl vinyl ketone, ethyl acrylate, methyl methacrylate, methacrylamide, and acrylonitrile. The proportion of the organic monomer other than chloroprene can be up to about 60% of the total polymer but usually less than 20%. The preferred monomer is acrylonitrile or an $\alpha,\beta$-unsaturated carboxylic acid, for example, acrylic acid or methacrylic acid. The preferred proportion of acrylonitrile or the carboxylic acid monomer is such that that proportion of the copolymer weight which is contributed by the nitrile or carboxyl groups (—COOH) is about 2–20%. In the case of carboxyl groups, the usual proportion would be about 5% or less.

It has been surprisingly found that copolymers of chloroprene and acrylonitrile or an $\alpha,\beta$-unsaturated carboxylic acid form under cigarette test conditions a char having good structural integrity, so that other char promoters either are not required or can be used in small amounts only.

The neoprene polymer is prepared by any well-known technique, but usually by emulsion polymerization in the presence of a free radical initiator, such as an organic peroxide or hydroperoxide. A chain transfer agent, such as an alkyl mercaptan or a dialkyl xanthogen disulfide, also is present. Chloroprene polymerizaton techniques are described in detail in the following U.S. patents: U.S. Pat. No. 3,651,037 (Snow); U.S. Pat. No. 3,839,241 (Harrell), particularly Example 3; U.S. Pat. No. 3,347,837 (Smith); and Belgian Pat. No. 815,662 (Du Pont Company). Polymerization in aqueous emulsion results in a neoprene latex.

Neoprene foam is produced from a neoprene latex using a method similar to those used to produce natural or other synthetic latex foams. In this method, a neoprene latex is mixed with compounding ingredients, such as a char promoter, a hydrated inorganic compound, vulcanizing agents, antioxidants, fillers, fire retardants, plasticizers, and frothing aids. The latex compound is frothed, for example, by beating, whipping, or mixing air or a gas into the compound or by causing a gas to be formed in the latex in situ. A gelling agent may be added to the comonomer to cause the froth to set, or a heat-sensitizing agent can be added to cause the froth to gel when heated, or the froth may be gelled by drying in such a manner that the bubbles do not collapse as the froth dries.

The froth is spread onto a fabric, release paper, or other suitable substrate and allowed to set to an irreversible gelled foam either through the use of a chemical gelling agent, by freezing, or by heating. The gelled foam is then dried at about 100°–120° C., and vulcanized.

Any of the various vulcanizing agents are suitable, such as zinc oxide or magnesium oxide. Suitable gelling agents include alkali metal silicofluorides, ammonium nitrate, or polyvinyl methyl ether. Suitable plasticizers include petrolatum and other waxes. Suitable frothing aids include ordinary soaps, sodium lauryl sulfate, cocoanut oil alkanolamides, ammonium stearate, and the like. Typical fillers include aluminum silicates, aluminum oxides, titanium dioxide, and the like. Flame retardant agents include those which have a known synergistic effect with halogenated compounds, such as antimony trioxide.

A neoprene foam of this invention is unexpectedly effective even in a thin layer in protecting both the covering and the padding from fire damage. This is due to a localized neoprene foam char formation in the fire source area. This char itself is not consumed by fire under test conditions (the fire does not propagate). Furthermore, by evolving water at higher temperatures, it provides a cooling effect, which prevents the fabric itself from igniting. The char is a good thermal insulator and thus prevents the padding under it from reaching a temperature at which it would volatilize. Thus, for a temperature of about 500° C. at the point of contact with a source of fire, the temperature under the layer of neoprene char normally would not exceed about 300° C. In order to perform its function, the char must have sufficient structural integrity, that is, it must be able to support its own weight as well as the weight of the melting fabric which is being absorbed therein.

In addition to the cigarette test, such as the above-mentioned California upholstered furniture test, neoprene foam-containing structures of the present invention have performed remarkably well in the "Radiant Panel Test", ASTM E 162-67, which is designed to show flame resistance in a large scale fire environment. These results are remarkable because prior art "flameproof" structures were able to pass the cigarette test but performed poorly in the Radiant Panel Test, or performed well in the Radiant Panel Test but failed the cigarette test. Furthermore, the excellent results in the present case were obtained for structures in which highly flammable fabrics (such as cotton or rayon) were used, without any "fireproofing" treatment of the fabrics themselves.

This invention is now illustrated by the following examples, wherein all parts, proportions, and percentages are by weight unless otherwise indicated.

TESTING

1. Modified California Test of Flame Retardance of Upholstered Furniture

This test is described in Technical Information Bulletin No. 116, State of California Department of Consumer Affairs, Bureau of Home Furnishings, Sacramento, California, May, 1974. It requires placing burning cigarettes on a smooth surface of test furniture and in various other locations, including the crevice between the seat cushion and the upholstered back panel. While the test requires testing on actual finished furniture, the tests in the following examples were run on furniture mockups. Horizontal test panels consisted of a nominal 5 cm. (2.0 inch) thick layer of cotton batting covered with a 20×20 cm. (8×8 in.) piece of fabric material. The vertical panels consisted of plywood support panels with a nominal 5 cm. (2.0 in.) thick layer of cotton batting, followed by a piece of 30×30 cm. (12×12 in.) test fabric stretched tightly over the surface, wrapped around the edges, and stapled to the backside.

An article of upholstered furniture fails the test if
 (1) obvious flaming combustion occurs;
 (2) a char develops more than two inches from the cigarette, measured from its nearest point.

2. ASTM E 162-67 Surface Flammability Test Using a Radiant Heat Energy Source This test (sometimes referred to in this disclosure as the Radiant Panel Test) employs a radiant heat source consisting of a 305×457 mm. (12×18 in.) panel in front of which an inclined 152×457 mm (6×18 in.) specimen of the material is placed. The orientation of the specimen is such that ignition is forced near the upper edge and the flame propagates downward. A factor derived from the rate of progression of the flame front is multiplied by another relating to the rate of heat liberation by the material under test to provide a flame spread index. The lower the numerical value of the flame spread index, the better is the flame resistance of the specimen.

FORMULATION

A typical recipe for preparing a neoprene latex foam is given in Table I.

TABLE I

|  | Dry Weight |
| --- | --- |
| Neoprene Latex | 100 |

TABLE I-continued

|  | Dry Weight |
| --- | --- |
| Zinc Oxide | 4 |
| Antimony Trioxide | 4 |
| Petrolatum | 2 |
| Foamole® AR[1] | 6 |
| DUPONOL® WAQ[2] | 2 |
| Hydrated Inorganic Compound | 0 to 150 |
| Char Promoter | 0 to 20 |

[1]Foamole® AR - cocoanut oil alkanolamide, VanDyke Chemical Co.
[2]DUPONOL® WAQ - sodium lauryl sulfate, E. I. du Pont de Nemours and Company In Examples 1, 2, 3, 4, 5, and 6, which follow, it is shown that it is necessary to incorporate both a char promoter and a hydrated inorganic compound in the latex to protect a fabric and cotton batting sufficiently to pass a cigarette test. In Examples 5 and 6, no char promoter other than the comonomer methacrylic acid is used.

EXAMPLE 1

Neoprene Latex Type A was compounded as in Table I without filler or char promoter. (Type A Latex is prepared as described in Example 3 of U.S. Pat. No. 3,839,241.) The latex was frothed in a Hobart mixer with a wire whip to a wet froth density of 12 pounds per cubic foot (0.19 g/cm.$^3$). The froth was spread onto a rayon pile, cottonbacked fabric at a thickness of 0.25 in. The froth was dried and cured for two hours at 121° C. The coated fabric was tested by placing it over 1-in. thick cotton batting in a seat/back chair configuration and placing the lighted cigarette in the crevice formed by the intersection of the seat and back. The heat from the cigarette charred the fabric and the neoprene foam. The char spread to a distance of more than two inches away from the cigarette and the cotton batting ignited. Thus, the composite failed the cigarette test.

EXAMPLE 2

The procedure outlined in Example 1 was followed, except that 25 parts per hundred parts of neoprene (phr) of alumina trihydrate (Hydral® RH31F, Alcoa) was added to the compound as the hydrated inorganic compound. When the cigarette test was repeated as above, the char area spread to more than two inches away from the cigarette and the cotton batting ignited. Thus, the composite failed the text.

EXAMPLE 3

The procedure outlined in Example 1 was followed, except that 15 phr Cyrez® 933 (melamine formaldehyde resin, American Cyanamid) was added to the latex compound as a char promoter. When the cigarette test was repeated as above, the char area spread to more than two inches away from the cigarette, and the cotton batting ignited. Thus, the composite failed the cigarette test.

EXAMPLE 4

The procedure outlined in Example 1 was followed, except that 10 phr Cyrez®933 and 25 phr alumina trihydrate were added as a char promoter and hydrated inorganic compound, respectively. When the cigarette test was repeated as above, the char area of the fabric spread to less than 0.5 inch away from the cigarette and the cotton batting did not ignite. Thus, the composite passed the cigarette test.

EXAMPLE 5

Neoprene Latex Type B was compounded as in Table I without filler or additional char promoter. (Latex Type B is prepared with 3 phr methacrylic acid comonomer which acts as an effective char promoter.) The latex was frothed in a Hobart mixer to a wet froth density of 14 pounds per cubic foot (0.22 g./cm.$^3$). The froth was spread onto a rayon pile, cotton-backed fabric at a thickness of 0.25 inch. The froth was dried and cured for two hours at 121° C. When the cigarette test was performed as above over 1-in. cotton batting, the char area of the fabric spread to more than 2 inches away from the cigarette and the cotton batting ignited. Thus, the composite failed the cigarette test.

EXAMPLE 6

The procedure outlined in Example 5 was followed, except that 25 phr alumina trihydrate was added to the latex compound as the hydrated inorganic compound. When the cigarette test was repeated as above, the char area spread to less than 0.5 inch away from the cigarette and the cotton batting did not ignite. Thus, the composite passed the cigarette test.

EXAMPLE 7

The procedures outlined in Examples 1 through 6 were repeated, except that a woven polypropylene fabric was used to replace the rayon pile fabric. When cigarette tests were performed over 1-in. cotton batting, it was found that foams prepared from Latex Type A failed unless 10 phr melamine formaldehyde resin and 25 phr hydrated alumina were both added. When foams prepared from Latex Type B were tested in the cigarette test, it was found that the composites failed unless 25 phr alumina trihydrate was added to the latex compound.

The improvement in flame resistance caused by a neoprene foam interliner in the Radiant Panel Test, ASTM E 162-67, is shown in Examples 8 through 14.

EXAMPLE 8

A rayon pile cotton-backed fabric was placed over a 1-in. thick fiber glass batting, then the composite was tested in the Radiant Panel Test. The flame spread index of the composite was 204. This gave the base figure for this type of fabric in this test.

EXAMPLE 9

The same rayon pile cotton-backed fabric was placed over a 1-in. thick commercial "non-fire retardant" polyurethane foam and the composite was tested in the Radiant Panel Test. The flame spread index of the composite was 618. This gave the base figure for this type of fabric over a polyurethane foam.

EXAMPLE 10

Neoprene Latex Type B was compounded as in Table I with 10 phr Cyrez® 933 and 25 phr alumina trihydrate as char promoter and hydrated inorganic compound, respectively. The latex was frothed to a wet froth density of 14 lbs./ft.$^3$ (0.22 g./cm.$^3$), and was spread onto the rayon pile cotton-backed fabric of Example 9 at a thickness of 0.25 inch. The froth was dried and cured for two hours at 121° C. The coated fabric was placed over the 1-in. thick "non-fire retardant" polyurethane foam, as in Example 9, and the composite was tested in the Radiant Panel Test. The flame spread index of the composite was 235.

EXAMPLE 11

The procedure outlined in Example 10 was repeated, except that 5 phr melamine formaldehyde resin and 150 phr hydrated alumina were used. When the coated rayon pile cotton-backed fabric was placed over a 1-in. thick "non-fire retardant" polyurethane foam, and this composite was tested in the Radiant Panel Test, the flame spread index of the composite was 156. This value for the flame spread index was lower than that obtained in Example 8, where the uncoated fabric was tested over fiber glass.

EXAMPLE 12

The procedure outlined in Example 8 was repeated, except that the fabric used was a woven polypropylene fabric. When tested in the Radiant Panel Test, the flame spread index of the composite was 303.

EXAMPLE 13

The procedure outlined in Example 9 was repeated, except that the fabric used was a woven polypropylene fabric. When tested in the Radiant Panel Test, the flame spread index of the composite was 996.

EXAMPLE 14

The procedure outlined in Example 10 was repeated, except that the fabric used was a woven polypropylene fabric. When tested in the Radiant Panel Test, the flame spread index of the composite was 278. This value for the flame spread index was lower than that obtained in Example 12, where the uncoated polypropylene fabric was tested over fiber glass.

Examples 15, 16, and 17, below, show that other latex foams can be applied to a fabric which will pass the cigarette test; however, such coated fabrics do not perform comparably well in larger scale tests.

EXAMPLE 15

A latex compound was prepared from a Hycar® (B.F. Goodrich) acrylic latex Type 2679, using the formulation in Table II.

TABLE II

|  | Dry Weight |
| --- | --- |
| Hycar® Type 2679 | 100 |
| Zinc Oxide | 4 |
| Antimony Trioxide | 4 |
| Petrolatum | 2 |
| Foamole® AR | 6 |
| DUPONOL® WAQ | 2 |
| Alumina Trihydrate | 150 |
| Cyrez® 933 | 5 |

The compound was frothed in a Hobart mixer to a wet froth density of 14 lbs./ft.$^3$ (0.22 g./cm.$^3$). The froth was spread onto a rayon pile, cotton-backed fabric at a thickness of 0.25 in. The froth was dried and cured for one hour at 280° F. When a portion of the coated fabric was tested in the cigarette test over cotton batting, the char area spread to less than 1.5 inches away from the cigarette and the cotton batting did not ignite. When a portion of the coated fabric was placed over a "non-fire retardant" polyurethane foam and the composite was tested in the Radiant Panel Test, the composite had a flame spread index of 749. This value was higher than that obtained for the uncoated fabric tested over polyurethane (Example 9). Thus, this composition did not provide protection to the composite structure in the Radiant Panel Test.

EXAMPLE 16

A latex compound was prepared from a Geon® (B.F. Goodrich) polyvinylchloride latex Type 460X9, using the formulation in Table III. (See B.F. Goodrich Bulletin L-15, Table 13).

TABLE III

|  | Dry Weight |
| --- | --- |
| Geon® Type 460X9 | 100 |
| DUPONOL® WAQ | 1.7 |
| Monoplex® S-73[1] | 8.2 |
| Ammonium Stearate | 6 |
| Tricresyl Phosphate | 60 |
| Alumina Trihydrate | 150 |
| Cyrez® 933 | 24 |

[1]Rohm & Haas Co.

This compound was frothed in a Hobart mixer to a wet froth density of 14 lbs./ft.$^3$ (0.22 g./cm.$^3$). The froth was spread onto a rayon pile, cotton-backed fabric at a thickness of 0.25 in. The froth was dried at 200° F. for 30 min. and was cured at 270° F. for one hour. When a portion of the coated fabric was tested in the cigarette test over cotton batting, the char area spread to less than 1.5 inches away from the cigarette and the cotton batting did not ignite. When the portion of the coated fabric was placed over a "non-fire retardant" polyurethane foam and the composite was tested in the Radiant Panel Test, the composite had a flame spread index of 507. Thus, this composition gives only a minor degree of protection to the tested structure.

EXAMPLE 17

An 0.25 in.-thick section of Pyrel® "fire-retardant" polyurethane foam (Scott Foam) was placed over 1-in. thick cotton batting and a woven polypropylene fabric was placed over this combination (as described in Belgian Pat. No. 817,571). When the composite was tested in the cigarette test, the char area spread to less than 1.5 in. away from the cigarette and so the combination passed the test.

An 0.25-in. thick section of Pyrel® was placed over a 1-in. thick "non-fire retardant" polyurethane foam, and a woven polypropylene fabric was placed over this combination. When the composite was tested in the Radiant Panel test, the flame spread index was 1514. This value was higher than when the fabric was tested over the polyurethane foam without the Pyrel® interliner (Example 13). Thus, the Pyrel® does not improve the protection of the fabric on the "non-fire retardant" polyurethane foam structure.

We claim:

1. A method of improving the flame resistance of upholstered furniture by interposing between the cover fabric and the padding or applying to the top side of the fabric a layer of neoprene foam which contains, in parts by weight per 100 parts by weight of the neoprene, about 5-15 parts of char promoter selected from the group consisting of urea/formaldehyde resins, melamine/formaldehyde resins, melamine phosphate, phthalic anhydride, pyromellitic anhydride, sodium borate, calcium borate, zinc borate, and boric acid and a hydrated inorganic compound containing an amount of hydration water equivalent to 10-180 parts of alumina hydrate, said hydrated inorganic compound retaining most of its hydration water at the foam drying and curing temperatures but losing it below about 500° C.;

the neoprene being a homopolymer of chloroprene or a copolymer of chloroprene with another ethylenically unsaturated organic monomer, the proportion of such other monomer being at most about 20 weight percent of the total polymer;

with the proviso that when the neoprene is a copolymer of chloroprene with acrylonitrile or with an $\alpha,\beta$-unsaturated carboxylic acid, the proportion of acrylonitrile or of the $\alpha,\beta$-unsaturated carboxylic acid is such that the proportion of the copolymer weight which is contributed by the nitrile or carboxyl groups is about 2-20 percent, and the char promoter may be absent.

2. The method of claim 1 wherein the neoprene foam layer is at least 1/16 inch thick.

3. The method of claim 2 wherein the neoprene foam layer is about ⅛-¼ inch thick.

4. The method of claim 1 wherein the hydrated inorganic compound is selected from hydrated alumina, hydrated magnesia, magnesium oxychloride, hydrated zinc borate, and hydrated calcium borate.

5. The method of claim 1 wherein the carboxylic acid is acrylic acid or methacrylic acid.

6. The method of claim 5 wherein the proportion of the carboxylic acid is such that the weight contribution of the carboxyl groups will be 5 percent or less of total polymer weight.

7. The method of claim 1 wherein the neoprene foam is an integral part of the cover fabric.

8. The method of claim 7 wherein the foam is applied to the top side of the fabric.

9. The method of claim 8 wherein the foam is applied between the fabric and a continuous layer of an elastomeric or plastic material.

10. The method of claim 1 wherein the neoprene foam is an integral, outer layer of the padding.

11. The method of claim 1 wherein the neoprene foam is a separate interliner.

12. The method of claim 1, wherein the neoprene is a copolymer of chloroprene with another organic monomer.

13. Furniture upholstery fabric having improved flame resistance, said fabric having integrally attached to it a layer of neoprene foam which contains, in parts by weight per 100 parts by weight of the neoprene, about 5-15 parts of a char promoter selected from the group consisting of urea/formaldehyde resins, melamine/formaldehyde resins, melamine phosphate, phthalic anhydride, pyromellitic anhydride, sodium borate, calcium borate, zinc borate, and boric acid and a hydrated inorganic compound containing an amount of hydration water equivalent to 10-180 parts of alumina hydrate, said hydrated inorganic compound retaining most of its hydration water at the foam drying and curing temperatures but losing it below about 500° C.;

the neoprene being a homopolymer of chloroprene or a copolymer of chloroprene with another ethylenically unsaturated organic monomer, the proportion of such other monomer being at most about 20 weight percent of the total polymer;

with the proviso that when the neoprene is a copolymer of chloroprene with acrylonitrile or with an $\alpha,\beta$-unsaturated carboxylic acid, the proportion of acrylonitrile or of the $\alpha,\beta$-unsaturated carboxylic acid is such that the proportion of the copolymer weight which is contributed by the nitrile or carboxyl groups is about 2-20 percent, and the char promoter may be absent.

14. The fabric of claim 13 wherein the neoprene foam layer is about ⅛-¼ inch thick.

15. The fabric of claim 13 wherein the hydrated inorganic compound is selected from hydrated alumina, hydrated magnesia, magnesium oxychloride, hydrated zinc borate, and hydrated calcium borate.

16. The fabric of claim 13 wherein the other monomer is acrylonitrile, acrylic acid, or methacrylic acid.

17. The fabric of claim 16 wherein the proportion of acrylic acid or methacrylic acid is such that the weight contribution of the carboxyl groups is about 5 percent or less of the total weight of the polymer.

18. The fabric of claim 13, wherein the neoprene is a copolymer of chloroprene with another organic monomer.

19. The fabric of claim 13 which is a nonwoven fabric.

20. Furniture padding having improved flame resistance, said padding having integrally attached to its outer surfaces a layer of neoprene foam which contains, in parts by weight per 100 parts by weight of the neoprene, about 5-15 parts of a char promoter selected from the group consisting of urea/formaldehyde resins, melamine/formaldehyde resins, melamine phosphate, phthalic anhydride, pyromellitic anhydride, sodium borate, calcium borate, zinc borate, and boric acid and a hydrated inorganic compound containing an amount of hydration water equivalent to 10-180 parts of alumina hydrate, said hydrated inorganic compound retaining most of its hydration water at the foam drying and curing temperatures but losing it below about 500° C.;

the neoprene being a homopolymer of chloroprene or a copolymer of chloroprene with another ethylenically unsaturated organic monomer, the proportion of such other monomer being at most about 20 weight percent of the total polymer;

with the proviso that when the neoprene is a copolymer of chloroprene with acrylonitrile or with an $\alpha,\beta$-unsaturated carboxylic acid, the proportion of acrylonitrile or of the $\alpha,\beta$-unsaturated carboxylic acid is such that the proportion of the copolymer weight which is contributed by the nitrile or carboxyl groups is about 2-20 percent, and the char promoter may be absent.

21. Furniture padding of claim 20 wherein the neoprene foam layer is about ⅛-¼ inch thick.

22. Furniture padding of claim 20 wherein the hydrated inorganic compound is selected from hydrated alumina, hydrated magnesia, magnesium oxychloride, hydrated zinc borate, and hydrated calcium borate.

23. Furniture padding of claim 20 wherein the other monomer is acrylonitrile, acrylic acid, or methacrylic acid.

24. The furniture padding of claim 23 wherein the proportion of acrylic acid or methacrylic acid is such that the weight contribution of the carboxyl groups is 5 percent or less of the weight of the polymer.

25. The padding of claim 20, wherein the neoprene is a copolymer of chloroprene with another organic monomer.

26. An article of upholstered furniture having improved flame resistance, said article having interposed between the cover fabric and the padding or applied to the top side of the cover fabric a layer of neoprene foam which contains, in parts by weight per 100 parts by weight of the neoprene, about 5-15 parts of a char promoter selected from the group consisting of urea/formaldehyde resins, melamine/formaldehyde resins, melamine phosphate, phthalic anhydride, pyromellitic anhydride, sodium borate, calcium borate, zinc borate, and boric acid and a hydrated inorganic compound containing an amount of hydration water equivalent to 10-180 parts of alumina hydrate, said hydrated inorganic compound retaining most of its hydration water at the foam drying and curing temperatures but losing it below about 500° C.;

the neoprene being a homopolymer of chloroprene or a copolymer of chloroprene with another ethylenically unsaturated organic monomer, the proportion of such other monomer being at most about 20 weight percent of the total polymer;

with the proviso that when the neoprene is a copolymer of chloroprene with acrylonitrile or with an $\alpha,\beta$-unsaturated carboxylic acid, the proportion of acrylonitrile or of the $\alpha,\beta$-unsaturated carboxylic acid is such that the proportion of the copolymer weight which is contributed by the nitrile or carboxyl groups is about 2-20 percent, and the char promoter may be absent.

27. An article of upholstered furniture of claim 26 wherein the neoprene foam layer is at least 1/16 inch thick.

28. An article of upholstered furniture of claim 27 wherein the neoprene foam layer is about ⅛-¼ inch thick.

29. An article of upholstered furniture of claim 26 wherein the hydrated inorganic compound is selected from hydrated alumina, hydrated magnesia, magnesium oxychloride, hydrated zinc borate, and hydrated calcium borate.

30. An article of upholstered furniture of claim 26 wherein the carboxylic acid is acrylic acid or methacrylic acid.

31. An article of upholstered furniture of claim 30 wherein the proportion of the carboxylic acid is such that the weight contribution of the carboxyl groups is about 5 percent or less of the total weight of polymer.

32. An article of upholstered furniture of claim 26 wherein the neoprene foam is an integral part of the cover fabric.

33. An article of claim 32 wherein the foam is applied to the top side of the fabric.

34. An article of claim 33 wherein the foam is applied between the fabric and a continuous layer of an elastomeric or plastic material.

35. An article of upholstered furniture of claim 26 wherein the neoprene foam is an integral, outer layer of the padding.

36. An article of upholstered furniture of claim 26 wherein the neoprene foam is a separate interliner.

37. The article of claim 26, wherein the neoprene is a copolymer of chloroprene with another organic monomer.

* * * * *